US010451001B2

(12) United States Patent
Sokhey

(10) Patent No.: US 10,451,001 B2
(45) Date of Patent: Oct. 22, 2019

(54) CMC OXIDE-OXIDE MIXER DESIGN

(71) Applicant: Rolls-Royce Corporation, Indianapolis, IN (US)

(72) Inventor: Jagdish S. Sokhey, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 517 days.

(21) Appl. No.: 14/947,210

(22) Filed: Nov. 20, 2015

(65) Prior Publication Data

US 2016/0160690 A1   Jun. 9, 2016

Related U.S. Application Data

(60) Provisional application No. 62/089,452, filed on Dec. 9, 2014.

(51) Int. Cl.
| *F02K 1/38* | (2006.01) |
| *F01D 25/28* | (2006.01) |
| *F02K 1/80* | (2006.01) |
| *F02K 1/48* | (2006.01) |

(52) U.S. Cl.
CPC .............. *F02K 1/386* (2013.01); *F01D 25/28* (2013.01); *F02K 1/80* (2013.01); *F02K 1/48* (2013.01); *F05D 2250/61* (2013.01); *F05D 2260/30* (2013.01); *F05D 2300/6033* (2013.01)

(58) Field of Classification Search
CPC ..... F02K 1/04; F02K 1/52; F02K 1/78; F02K 1/80; F02K 1/386; F02K 1/46; F02K 1/48; F02K 1/50; F02K 1/00; F02K 9/32; F05D 2260/30; F05D 2240/90; F05D 2240/91; F23R 3/30; F01D 25/28; F01D 25/24; F01D 25/243; F02C 7/20
USPC ........................................................ 60/770
See application file for complete search history.

(56) References Cited

U.S. PATENT DOCUMENTS

| 4,566,270 | A | 1/1986 | Ballard et al. |
| 4,907,743 | A | 3/1990 | Bouiller et al. |
| 5,440,875 | A * | 8/1995 | Torkelson ................ F02K 1/36 239/265.17 |
| 6,606,854 | B1 | 8/2003 | Siefker et al. |
| 7,677,026 | B2 | 3/2010 | Conete et al. |
| 8,141,370 | B2 * | 3/2012 | Bulman .................... F02C 3/14 60/752 |
| 8,590,316 | B2 * | 11/2013 | Conete .................... F02K 1/386 239/265.19 |

(Continued)

FOREIGN PATENT DOCUMENTS

EP    1797310 A1    6/2007

OTHER PUBLICATIONS

European Search Report for EP15197419.

*Primary Examiner* — Gerald L Sung
*Assistant Examiner* — Stephanie Cheng
(74) *Attorney, Agent, or Firm* — Fishman Stewart PLLC

(57) ABSTRACT

An exhaust mixing system having an attachment flange configured to couple a lobed Oxide-CMC exhaust mixer to a turbine engine. The attachment flange includes an annulus and a plurality of projections extending from the annulus in a first direction that is substantially parallel to a central axis of the annulus. The annulus is configured to couple to the turbine engine and the plurality of projections is configured to couple to the lobed mixer.

16 Claims, 5 Drawing Sheets

(56) References Cited

U.S. PATENT DOCUMENTS

| | | | |
|---|---|---|---|
| 8,726,665 B2* | 5/2014 | Moore | F02K 1/386 |
| | | | 60/725 |
| 9,995,245 B2* | 6/2018 | Dindar | F02K 1/48 |
| 2007/0117480 A1 | 5/2007 | Carper et al. | |
| 2007/0240423 A1* | 10/2007 | Bulman | F23R 3/007 |
| | | | 60/753 |
| 2008/0115484 A1 | 5/2008 | Conete et al. | |
| 2009/0064681 A1* | 3/2009 | Keith | F01D 25/243 |
| | | | 60/770 |
| 2010/0310764 A1 | 12/2010 | Arnold et al. | |
| 2011/0203255 A1 | 8/2011 | Conete | |
| 2012/0160933 A1 | 6/2012 | Vauchel et al. | |
| 2012/0297791 A1 | 11/2012 | Suciu et al. | |
| 2013/0020408 A1 | 1/2013 | Jasklowski et al. | |
| 2014/0053563 A1 | 2/2014 | De Sousa et al. | |
| 2014/0241863 A1 | 8/2014 | Tardif | |
| 2015/0152788 A1* | 6/2015 | De Sousa | F01D 25/24 |
| | | | 60/39.5 |
| 2016/0131077 A1* | 5/2016 | Debray | F01D 25/243 |
| | | | 60/770 |

* cited by examiner

CMC OXIDE-OXIDE MIXER DESIGN

CROSS-REFERENCE TO RELATED APPLICATIONS

This application claims priority to U.S. Provisional Patent Application No. 62/089,452 filed Dec. 9, 2014, the contents of which are hereby incorporated in their entirety.

FIELD OF TECHNOLOGY

An improved exhaust mixing system is disclosed. Although the improvements are applicable to exhaust mixing systems for turbine engines used for propulsive power in air, the improvements are also applicable to exhaust mixing systems for turbine engines employed in marine, underwater, and land applications.

BACKGROUND

It has become increasingly desirable to improve the overall system, design, and operation of exhaust mixing systems for jet turbines such as turbofan engines. In an exhaust mixing system coupled to a typical turbofan engine, the exhaust mixing system may serve to increase thrust and decrease engine noise. As such, engine operation may be improved and/or engine wear may be minimized. An inefficient or ineffective exhaust mixing system, however, can lead to decreased engine efficiency and increased noise.

Accordingly, there is room for further improvements in this area.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine having an improved exhaust mixing system is disclosed. The mixing system includes an attachment system for securing a lobed mixer to an engine interface. A novel method of manufacturing an exhaust mixing system is further disclosed.

Figure 1:
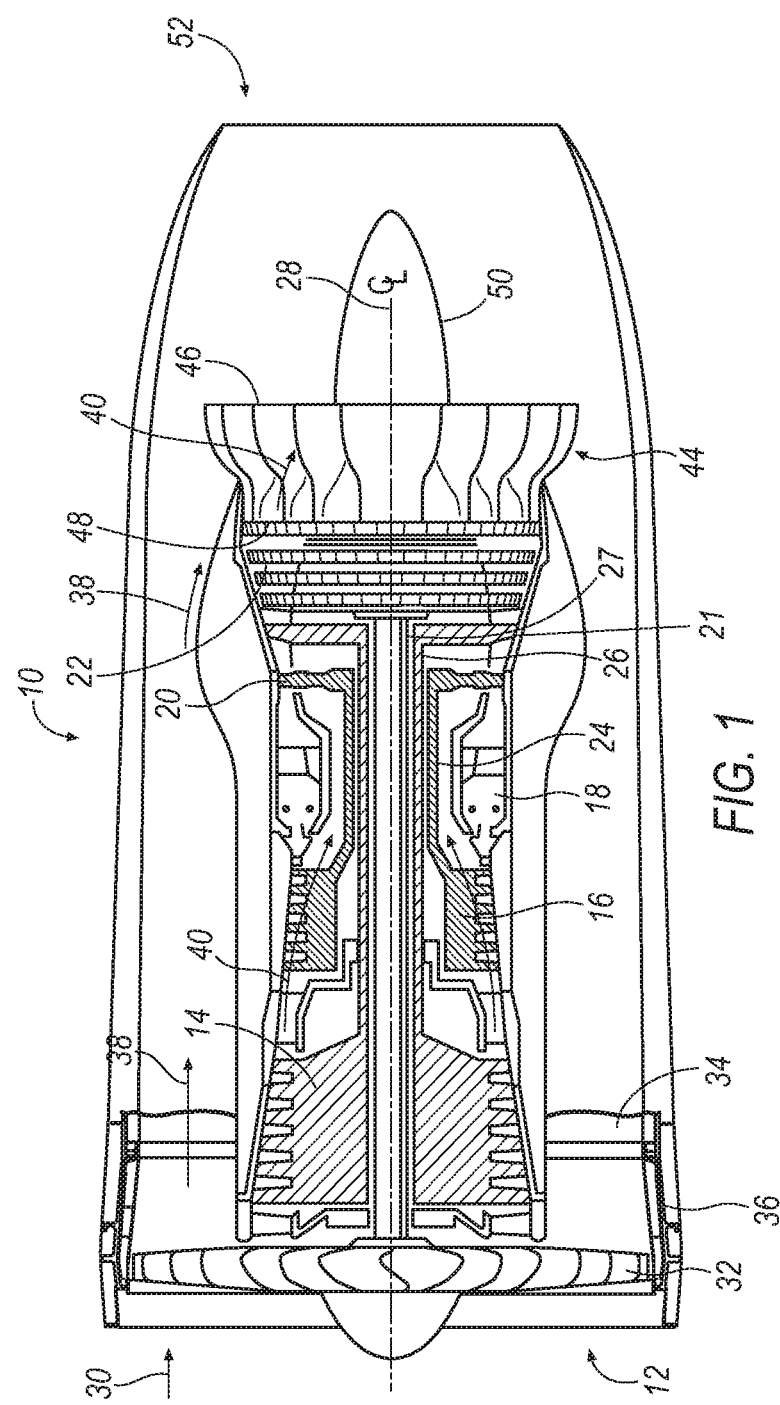
FIG. 1 illustrates an exemplary turbine engine having an exhaust mixing system, according to an embodiment.

FIG. 1 illustrates an exemplary gas turbine engine 10, which includes a fan 12, a low pressure compressor and a high pressure compressor, 14 and 16, a combustor 18, and a high pressure, mid pressure and low pressure turbine, 20, 21 and 22, respectively. The high pressure compressor 16 is connected to a first rotor shaft 24 while the low pressure compressor 14 is connected to a second rotor shaft 26. The low pressure turbine 22 is connected to another shaft 27. The shafts extend axially and are parallel to a longitudinal center line axis 28. FIG. 1 illustrates a three shaft engine, it will be appreciated that exemplary embodiments further contemplate two shaft and/or single shaft configurations.

Ambient air 30 enters the fan 12 and is directed across a fan rotor 32 in an annular duct 34, which in part is circumscribed by fan case 36. The bypass airflow 38 provides a large fraction of engine thrust while the primary gas stream 40 (a.k.a. core airflow) is directed to the combustor 18 and the turbines 20, 21, 22, and then exhausted through a nozzle generating thrust. The engine 10 includes an improved exhaust mixing system 44. The system 44 may include a lobed mixer 46 which can be coupled to an engine interface or support 48 (e.g., rear turbine support). The exhaust mixing system 44 enhances the mixing of the core airflow 40 that passes through the low pressure turbine 22 with the bypass airflow 38 that passes over the lobed mixer 46, thus increasing thrust. The mixing of the core airflow 40 and the bypass airflow 38, while each pass over a tail cone 50 and exit at exhaust nozzle 52, may also reduce turbine noise.

Figure 2A:
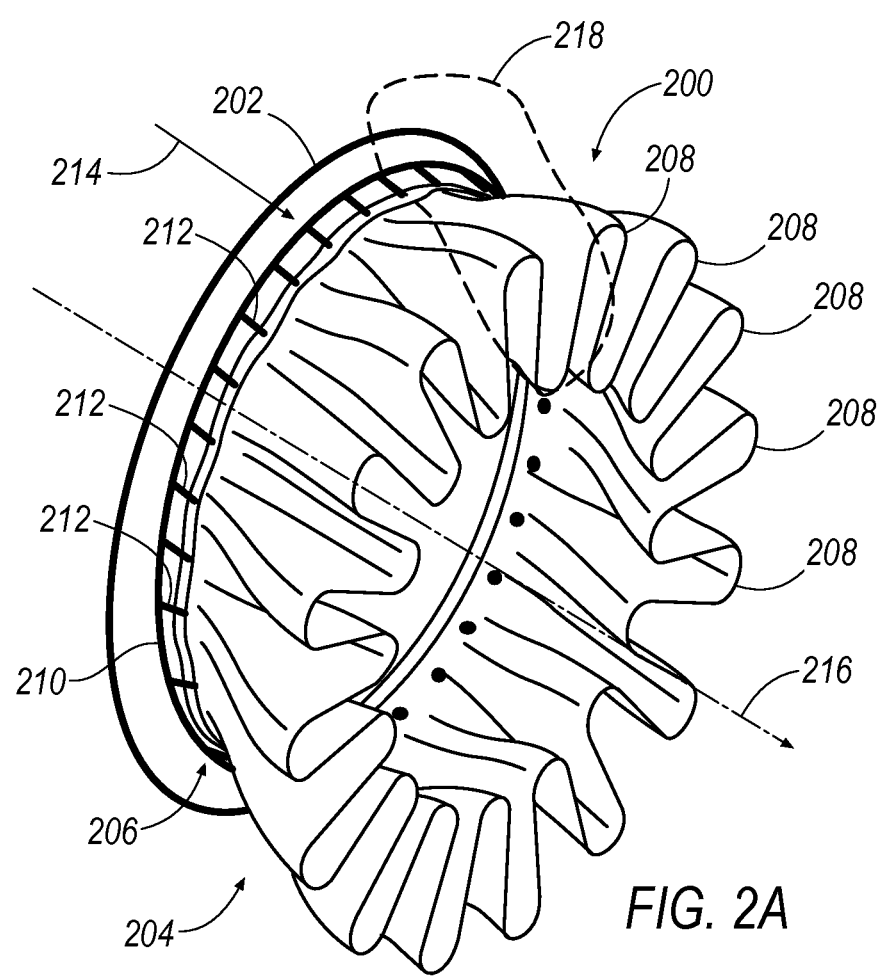
FIG. 2A illustrates an exemplary exhaust mixing system according to another embodiment.

With reference now to FIG. 2A, a perspective view of an exemplary exhaust mixing system 200 coupled to an engine interface or rear turbine support 202 is illustrated. The exhaust mixing system 200 includes a lobed exhaust mixer 204 and coupling attachment or flange 206, which couples the lobed exhaust mixer 204 to the engine interface 202. The lobed exhaust mixer 204 may, for example, be comprised of a single unit that circumscribes 360 degrees. Alternatively, though not shown, the lobed exhaust mixer 204 may be comprised of two or more semi-annular components that together circumscribe 360 degrees.

The lobed exhaust mixer 204 is fabricated from, for example, ceramic matrix composite (CMC) materials, such as high strength ceramics alumina fibers in an alumina oxide composite matrix. Alternate embodiments may include other CMC materials such as alumino-silicate fibers in a ceramic matrix. Regardless of the CMC materials employed, the CMC lobed exhaust mixer 204 includes a plurality of lobes 208 that enhance mixing of core airflow and bypass airflow in such a manner to increase thrust and decrease engine noise. According to alternate embodiments, the number of lobes of the CMC lobed exhaust mixer may be more or less than the number of lobes illustrated in FIG. 2A.

The CMC lobed exhaust mixer 204 is configured to mix generally warm or hot core airflow (e.g., primary gas stream 40 of FIG. 1) with cooler bypass flow (e.g., bypass airflow 38 of FIG. 1) via the plurality of lobes 208, FIG. 2A. The mixing of the two airflows by the CMC lobed exhaust mixer 204 generally increases thrust when compared to exhaust systems (not shown) that are not configured to mix, or to enhance the mixture of, core airflow and bypass airflow. In addition to increasing jet thrust, the mixing of the core and bypass airflows enhanced by the plurality of lobes 208 may decrease jet induced noise.

Structures comprised of CMC materials generally weigh less than similar structures comprised of metallic materials.

Further, structures comprised of CMC materials also tend to outperform many comparable metallic structures in their ability to maintain structural shape at higher temperatures. As such, the CMC lobed exhaust mixer 204 generally weighs less and is more durable than comparable mixers comprised of metallic materials. The reduction of weight, in turn, generally enhances fuel efficiencies of the turbofan engine (e.g., gas turbine engine 10 of FIG. 1).

As illustrated in FIG. 2A, the coupling attachment or flange 206 of the exhaust system 200 includes an annulus or coupling ring 210 having a plurality of projections (a.k.a. finger couplings) 212 extending linearly therefrom. The coupling attachment 206 may, for example, be comprised of a metal alloy or super alloy such as Inconel® 625. Further, the coupling attachment 206 may be a single fabricated unit circumscribing 360 degrees or, alternatively, the coupling attachment 206 may be comprised of a plurality of semi-annular components that together circumscribe 360 degrees.

The plurality of projections 212 of the coupling attachment 206 project from the annulus 210 in a first direction 214 that is substantially parallel to a central axis 216 of the annulus 210. The coupling attachment 206 couples the CMC lobed exhaust mixer 204 to an engine support or interface 202 of a turbofan engine (alternatively see, e.g., support 48 of engine 10 illustrated in FIG. 1). That is, as illustrated in FIG. 2A, the annulus 210 of the coupling attachment 206 couples to the engine interface 202, while the plurality of projections 212 of the coupling attachment 206 couples to the CMC lobed exhaust mixer 204. Each projection of the plurality of projections 212 has the ability to flex. As such, the plurality of projections or finger couplings 212 maintain integrity when the CMC lobed exhaust mixer 204 is subjected to a range aerodynamic or thermal loads.

It is contemplated that the quantity of projections in the plurality of projections 212 is proportional to the quantity of lobes in the CMC lobed exhaust mixer 204. For example, there may be two to four times as many projections 212 as there are lobes 208. It is noted, however, that there need not be a 2:1, 3:1, or 4:1 relationship between the number of projections and the number of lobes. For example, based on weight and/or size factors of the CMC lobed mixer (e.g., CMC lobed exhaust mixer 204), fewer or more projection may be employed.

In addition to coupling the CMC lobed exhaust mixer 204 to the engine (e.g., engine 10 of FIG. 1), the coupling attachment 206 also serves to reduce stress on the system minimizing structural deflections to the mixer lobes. That is, load is able to pass from the support 202, through coupling attachment 206, and to CMC lobed exhaust mixer 204 without causing (or at least by minimizing) local or structural stresses on the system. Since the coupling attachment 206 has the ability to flex, it serves as an intermediary between the rear turbine support 202 and the CMC lobed exhaust mixer 204.

Figure 2B:
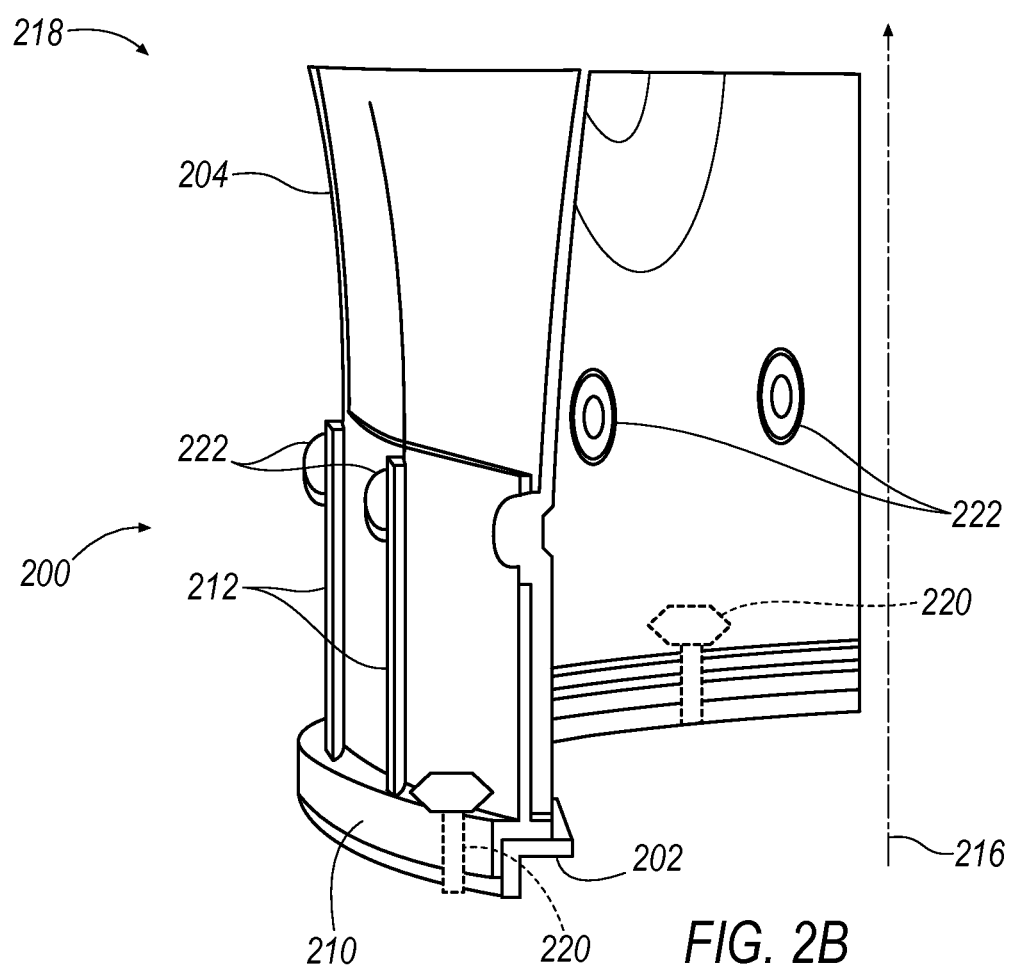
FIG. 2B is a cross-sectional view of a portion of the exemplary exhaust mixing system of FIG. 2A, according to an embodiment.

Referring now to FIG. 2B, a cross-sectional view of a portion 218 of the exemplary exhaust mixing system 200 of FIG. 2A is illustrated. According to an embodiment, and as illustrated in FIG. 2B, the annulus 210 is coupled the engine interface or rear turbine support 202 via a plurality of annulus mounting hardware 220. Further, each projection of the plurality of projections 212 couples to the CMC lobed exhaust mixer 204 via a plurality of projection mounting hardware 222. The mounting means or hardware 220, 222 may, for example, include machined bolts and nuts or other fasteners (not shown).

Figure 3A:
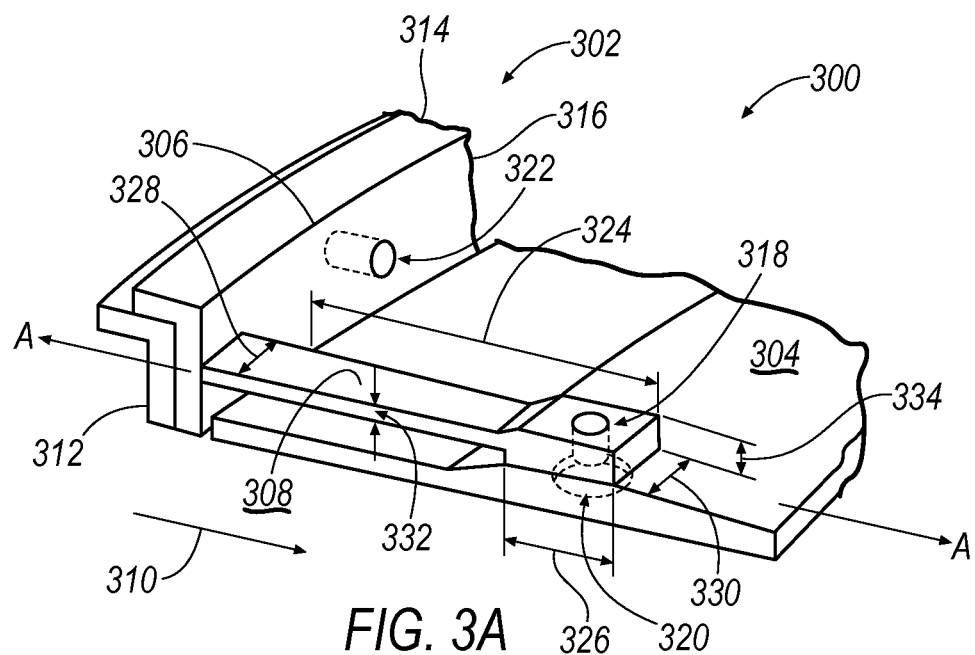
FIG. 3A is a perspective view of a portion of an exhaust mixing system, according to an embodiment.

With reference now to FIG. 3A, a perspective view of a portion of an exemplary exhaust mixing system 300 is illustrated. The portion of the exhaust mixing system 300 includes a portion of a coupling means or attachment 302 (a.k.a. attachment flange) and a portion of a CMC lobed exhaust mixer 304. The partial coupling attachment 302 includes a portion of an annulus 306 having a finger coupling 308 projecting linearly therefrom along a first direction 310. The annulus 306 affixes to an engine interface 312 and the finger coupling 308 affixes to the CMC lobed exhaust mixer 304, thus coupling the exhaust mixing system 300 to the turbine engine (e.g., engine 10 of FIG. 1).

The annulus 306 includes a first leg 314 in union with a second leg 316. The second leg 316 is substantially perpendicular to the first leg 314, while the first leg 314 is substantially parallel with the first direction 310.

The finger coupling 308 includes a void 318 that aligns with a void 320 in the CMC lobed exhaust mixer 304. As such, a fastener or mounting hardware (e.g., the plurality of projection mounting hardware 222 of FIG. 2B) can pass through each void 318, 320 to couple the CMC lobed exhaust mixer 304 to the coupling attachment 302. Additionally, the annulus 306 includes a plurality of voids (see exemplary annulus void 322), which allow mounting hardware (e.g., plurality of annulus mounting hardware 220 of FIG. 2B) to pass therethrough so that the annulus 306 may be coupled to the engine interface 312. As such, via the engine interface 312, the exhaust mixing system 300 is coupled to an engine (e.g., engine 10 of FIG. 1).

Due to the geometry of the finger couplings (e.g., finger coupling 308) and the manner in which the CMC lobed exhaust mixer 304 is coupled to the engine interface 312, loads due to aerodynamic pressure and thermal growth are reduced and substantially in shear.

According to the embodiment illustrated in FIG. 3A, the finger coupling 308 has a finger length 324 of $L_1$, a head length 326 of $L_2$, a shaft width 328 of $W_1$, a head width 330 of $W_2$, a shaft thickness 332 of $T_1$, and a head thickness 334 of $T_2$. According to an embodiment, finger coupling dimensions may fall within the following guidelines: finger length 324 ($L_1$) is four to six times the dimension of the shaft width 328 ($W_1$); the head thickness 334 ($T_2$) is two to three times the dimension of the shaft thickness 332 ($T_1$); the shaft width 328 is one to 1.3 times the dimension of the head width 330 ($W_2$); and the shaft thickness 332 ($T_1$) is approximately 0.10 times the dimension of the shaft width 328 ($W_1$). Finger couplings manufactured within these guidelines enhance the couplings ability to flex, thus enhancing the coupling attachment's 302 ability to operate through a range of aerodynamic or thermal loads. This ability to flex increases the opportunity for loads to pass from support 312, through coupling attachment 302, and to lobed exhaust mixer 304 without causing undo local or structural stresses. It is noted that alternate guidelines for the manufacture of attachment flanges may be employed while still allowing the coupling attachment 302 to serve as an intermediary between support 312 and lobed exhaust mixer 304.

Figure 3B:
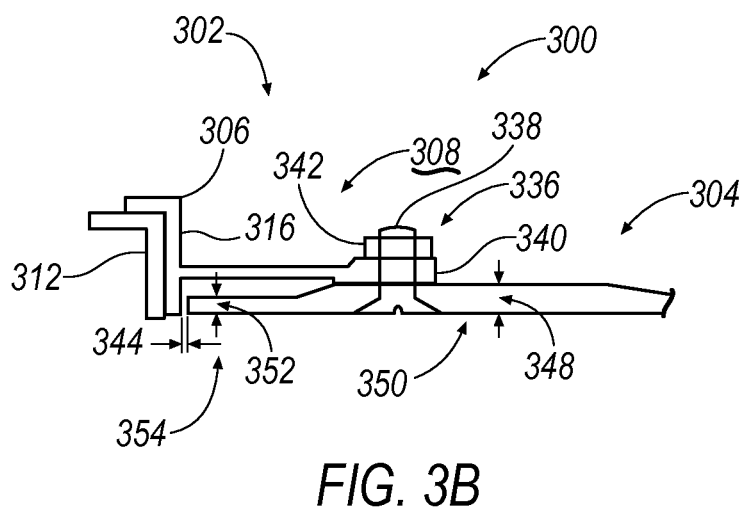
FIG. 3B is a cross-sectional view taken along A-A of the exhaust mixing system of FIG. 3A, according to an embodiment.

Referring now to FIG. 3B, a cross-sectional view taken along line A-A of the exhaust mixing system 300 of FIG. 3A is illustrated, according to an embodiment. The exhaust mixing system 300 of FIG. 3B includes a set of finger mounting hardware 336 (a.k.a. projection mounting hardware). The finger mounting hardware 336 includes a flat head bolt 338 that passes through the CMC lobed exhaust mixer 304 and a head 340 of the finger coupling 308. The finger mounting hardware 336 also includes a nut 342 that, in conjunction with the flat head bolt 338, affixes the finger coupling 308 to the CMC lobed exhaust mixer 304. Though the finger mounting hardware 336 depicted in FIG. 3B includes the nut 342 and the flat head bolt 338, embodiments (not shown) employing other mounting hardware or fastening systems are envisioned.

As illustrated in FIG. 3B, there is a gap 344 between the second leg 316 of the annulus 306 and the CMC lobed exhaust mixer 304. This gap 344 allows for thermal growth of the annulus 306 and/or the CMC lobed exhaust mixer 304 during operation at increasing temperatures. As such, the potential for binding between a first edge 354 of the CMC lobed exhaust mixer 304 and the annulus 306 is at least minimized when the exhaust mixing system 300 is operating at increasing temperatures. Since the CMC lobed exhaust mixer 304 and support 312 are generally manufactured from different materials, the coupling attachment 302 (with its annulus 306 and plurality of finger couplings 308) serves as an intermediary that reduces local or structural stresses on the system.

It is noted that, according to the embodiment depicted in FIG. 3B, a thickness 348 ($T_3$) at a mounting region 350 of the CMC lobed exhaust mixer 304 is greater than a thickness 352 ($T_4$) at the first edge 354 of the CMC lobed exhaust mixer 304. The increased thickness 348 ($T_3$) adds integrity to the CMC lobed exhaust mixer 304 where the mounting region 350 meets the head 340 of the finger coupling 308.

Figure 4:
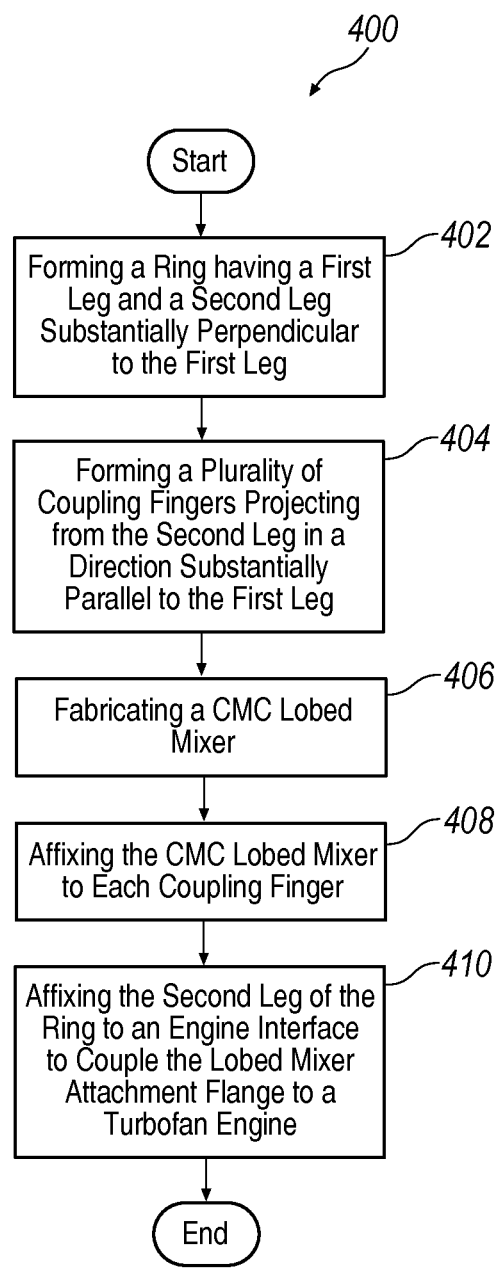
FIG. 4 is a flowchart representing an exemplary method of manufacturing an exhaust mixing system, according to an embodiment.

With reference now to FIG. 4, a flowchart 400 represents an exemplary method of manufacturing an exhaust mixing system, (e.g., exhaust mixing system 44 of FIG. 1, exhaust mixing system 200 of FIGS. 2A-2B, and/or exhaust mixing system 300 of FIGS. 3A-3B).

Process control begins at block 402, where the method includes forming a ring having a first leg and a second leg substantially perpendicular to the first leg. Process control then proceeds to block 404, where the method further includes forming a plurality of coupling fingers projecting from the second leg of the ring in a direction substantially parallel to the first leg. Together, the ring and the plurality of coupling fingers form an annular lobed mixer attachment flange. It is contemplated that the ring and coupling fingers may be formed as separate features and then later joined. As such, forming of the coupling fingers may occur prior to, or at the same time as, the forming of the ring. Alternatively, a mold may be employed to fabricate the attachment flange with the ring and coupling fingers as a single unit (or a plurality of semi-annular units).

After fabricating the attachment flange (i.e., blocks 402, 404), process control proceeds to block 406, where the method of manufacturing includes fabricating a CMC lobed mixer. It is noted that, though the flowchart 400 depicts the fabrication of the CMC lobed mixer (i.e., block 406) occurring prior to the fabrication of the attachment flange (i.e., block 402, 404), alternate methods of manufacture may fabricate the CMC mixer prior to, or at the same time as, the fabrication off the attachment flange. For example, the Oxide-Oxide CMC mixer may be formed or shaped as a laminate. The laminate process is similar to a process that employs polymer composites, except it is sintered at high temperature and trimmed to design.

With continued reference to the flowchart 400 of FIG. 4, after fabrication of the CMC lobed mixer, process control proceeds to block 408, where the method includes affixing the CMC lobed mixer to each coupling finger of the plurality of coupling fingers. According to an embodiment, the CMC lobed mixer is coupled to each coupling finger in such a manner to ensure that the CMC lobed mixer does not come in contact with the ring of the attachment flange. That is, the CMC lobed mixer is affixed to the attachment flange such that there is a gap between an upstream end of the CMC lobed mixer and the ring of the attachment flange. It is contemplated that this gap allows for thermal growth of the lobed mixer and/or attachment flange. Accordingly, the possibility of the CMC lobed mixer coming in contact with the ring of the attachment flange during normal high temperature operation is at least minimized.

After the CMC lobed mixer is affixed to the attachment flange, process control proceeds to block 410, where the method includes affixing the second leg of the attachment flange ring to an engine interface (e.g., a rear turbine support). The engine interface is an interface employed to couple the exhaust mixer system (i.e., the CMC lobed mixer and the attachment flange) to the turbofan engine. In other words, the CMC lobed mixer and attachment flange are coupled to a turbofan engine via the engine interface. The attachment flange serves as an intermediary between the engine interface and the CMC lobed mixer and, as such, allows loads to pass through the system while minimizing local stresses. It is noted that rivets, nuts and bolts, and/or another type of fastener may be used to fasten the attachment flange to the engine interface.

Process control then proceeds to an end after affixing the ring to the engine interface.

It is noted that, according to an alternate embodiment, the attachment flange may be attached to the engine interface prior to, or at the same time as, attachment of the CMC lobed mixer to the attachment flange.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An exhaust mixing system for a turbine engine, the exhaust mixing system comprising:
   a lobed exhaust mixer;
   an attachment flange configured to couple the lobed exhaust mixer to the turbine engine,
   wherein the attachment flange comprises:
   an annulus configured to couple to the turbine engine; and
   a plurality of projections each extending linearly from a first end at the annulus along a first direction substantially parallel to a central axis of the annulus to a second end opposite the first end, wherein the plurality of projections is configured to couple to the lobed exhaust mixer at the second ends;
   wherein each of the plurality of projections has a thickness in a radial direction that, at the second end, increases by extending further both radially inward and radially outward relative to the central axis.

2. The exhaust mixing system of claim 1, wherein the lobed exhaust mixer is comprised of a ceramic matrix composite material.

3. The exhaust mixing system of claim 1, wherein the annulus comprises:
   a first annular leg having the plurality of projections extending therefrom; and
   a second annular leg in union with the first annular leg.

4. The exhaust mlxmg system of claim 3, wherein the first annular leg is substantially perpendicular to the second annular leg.

5. The exhaust mixing system of claim 1, wherein a total number of projections in the plurality of projections is twice as many as a total number of lobes in the lobed exhaust mixer.

6. The exhaust mixing system of claim 1, wherein the attachment flange is comprised of a superalloy.

7. A turbine engine comprising:
   an engine interface;
   an exhaust mixer that is configured to mix an engine core air flow with a bypass air flow;
   a coupling ring with a central axis configured to couple to the engine interface of the turbine engine; and
   a plurality of coupling fingers each having a first end adjacent to the coupling ring and a second end opposite the first end, the plurality of coupling rings each projecting linearly from the first end to the second end in a first direction;
   wherein the second end of each coupling finger of the plurality of coupling fingers is configured to be coupled to the exhaust mixer
   wherein a thickness of each coupling finger increases from a uniform thickness at the first end to an enlarged portion at the second end, the thickness at the enlarged portion being greater than the uniform thickness at the first end, the
   thickness sloping from the uniform thickness to a radially outer surface of the enlarged portion and stepping radially inward with respect to the central axis from the uniform thickness to a radially inner surface of the enlarged portion.

8. The turbine engine of claim 7, wherein the first direction in which the plurality of coupling fingers projects is substantially parallel to the central axis of the coupling ring.

9. The turbine engine of claim 7, wherein the exhaust mixer is a lobed exhaust mixer comprising ceramic matrix composite oxide-oxide materials, and wherein the coupling ring and the plurality of coupling fingers comprise a metallic alloy material.

10. The turbine engine of claim 9, wherein a total quantity of coupling fingers in the plurality of coupling fingers is from two to four times a total quantity of lobes in the lobed exhaust mixer.

11. The turbine engine of claim 9, wherein each coupling finger of the plurality of coupling fingers includes a void at the second end configured to allow mounting hardware to pass therethrough to the lobed exhaust mixer to couple each coupling finger to the lobed exhaust mixer.

12. The turbine engine of claim 7, wherein the coupling ring comprises:
   a first leg substantially parallel to the first direction; and
   a second leg in union with the first leg, wherein the second leg is substantially perpendicular to the first leg.

13. The turbine engine of claim 12, further comprising a plurality of bolts, wherein the second leg is configured to allow the plurality of bolts to pass therethrough to affix the coupling ring to the engine interface.

14. The exhaust mixing system of claim 1, wherein the plurality of projections extend from the annulus toward the lobed exhaust mixer, and wherein each of the plurality of projections includes a shaft portion extending from the first end to a head portion at the second end and by which each of the plurality of projections is configured to couple to the lobed exhaust mixer.

15. The exhaust mixing system of claim 14, wherein at least one of: a thickness of the head portion is greater than a thickness of the shaft portion; and
   a width of the shaft portion is greater than a width of the head portion.

16. The exhaust mixing system of claim 15, wherein at least one of:
   the thickness of the head portion is between two to three times greater than the thickness of the shaft portion; and
   the width of the shaft portion is one to 1.3 times greater than the width of the head portion.

* * * * *